United States Patent [19]

Douglas et al.

[11] Patent Number: 5,230,543
[45] Date of Patent: Jul. 27, 1993

[54] SAFETY BUMPER FOR AN AUTOMATIC GUIDED VEHICLE

[75] Inventors: Barry D. Douglas, Doylestown; John M. Kuzmission, Pennsburg, both of Pa.

[73] Assignee: FMC Corporation, Chicago, Ill.

[21] Appl. No.: 789,516

[22] Filed: Nov. 8, 1991

[51] Int. Cl.⁵ .................... B60R 19/02; B60T 7/22
[52] U.S. Cl. ............................. 293/2; 293/4; 293/154; 180/274; 180/275; 180/279; 901/1; 901/49; 200/61.44
[58] Field of Search ............ 293/2, 4, 154; 180/274, 180/275, 277, 279; 901/1, 49; 200/61.44

[56] References Cited

U.S. PATENT DOCUMENTS

| | | | |
|---|---|---|---|
| 1,325,729 | 12/1919 | Lyon | 293/154 X |
| 3,664,701 | 5/1972 | Kondur | 293/4 |
| 4,730,690 | 3/1988 | McNutt et al. | 293/4 X |
| 5,048,637 | 9/1991 | Lomasney | 180/275 X |

FOREIGN PATENT DOCUMENTS 2523908 9/1983 France .................... 293/2

Primary Examiner—Dennis H. Pedder
Attorney, Agent, or Firm—J. Preston Oxenham; Henry C. Query, Jr.; Richard B. Megley

[57] ABSTRACT

A band-like safety bumper for an automatic guided vehicle has a hinge pin rigidly attached at either end with a lever rigidly attached to the pin. A proximity switch is located near the lever and sends control signals to stop the vehicle as a result of obstacle induced movement of the lever.

12 Claims, 2 Drawing Sheets

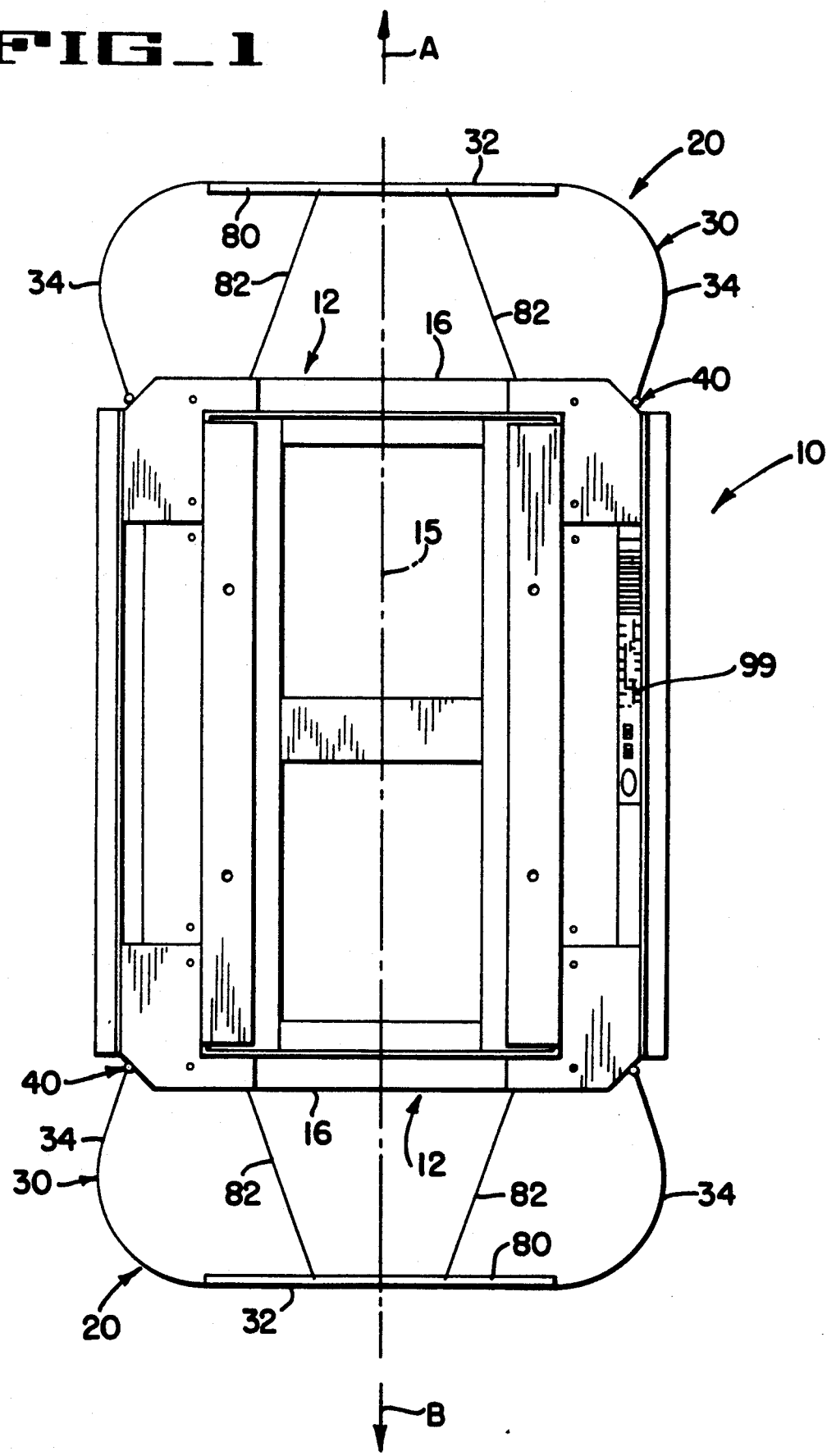

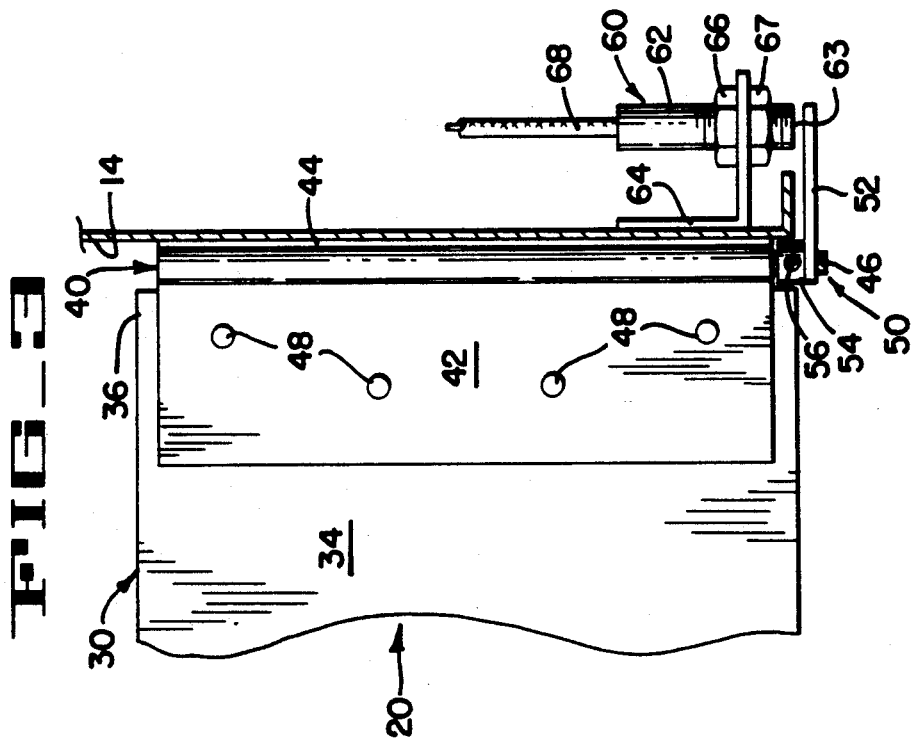
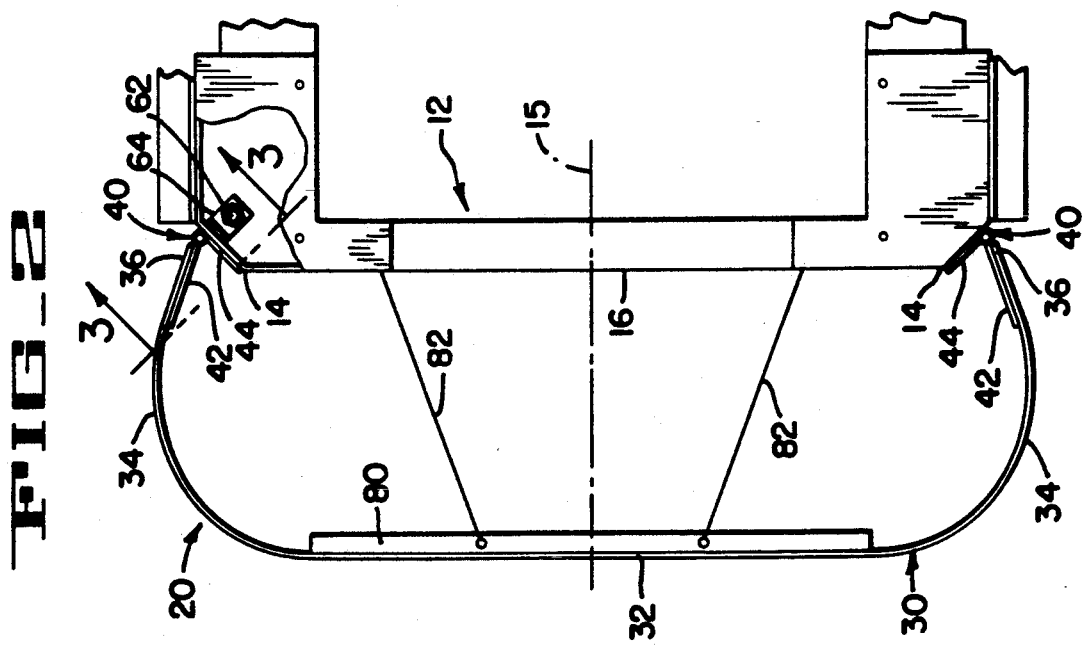

SAFETY BUMPER FOR AN AUTOMATIC GUIDED VEHICLE

TECHNICAL FIELD

The present invention relates to automatic guided vehicles generally, and most particularly to safety bumpers for automatic guided vehicles which are intended to detect objects in the path of the automatic guided vehicle so that vehicle motion may be stopped upon such detection.

BACKGROUND OF THE INVENTION

Automatic guided vehicles are utilized in material handling systems to effectively and efficiently transport materials in a wide variety of industry environments such as factories and hospitals. Safety systems incorporated in the design of these vehicles include safety bumpers equipped with sensing and control devices to sense objects which come into contact with the bumper and stop the vehicle upon encountering an object in the vehicle path to prevent a collision of the vehicle with the object. Effective operation of these safety devices is essential to assure the safety of personnel and property in the vehicle's operational environment. These safety bumpers must be capable of resetting themselves and undergoing repeated operation without being damaged yet, the effectiveness of the bumper to stop the automatic guided vehicle upon contact with an object cannot be compromised. There should be no dead spots or zones in the bumper sensing field. The device should not cause nuisance shutdowns of the vehicle when personnel or property are not endangered.

Automatic guided vehicle safety bumpers of the prior art have included rigid or flexible bumper panels supported in front of the automatic guided vehicle by struts and stabilizing guy wires which allow displacement of the bumper panel by an object which comes into contact with it. Sensors are provided to detect movement of the bumper panel and send a signal to a control device which stops movement of the vehicle upon the occurrence of such a displacement.

Many safety bumpers of the prior art have utilized mechanical switches attached to the bumper struts and guy wires to send bumper panel displacement signals. Many of these devices lack the desired sensitivity necessary to stop movement of the vehicle upon contact with an object striking the panel at any possible location in the danger zone of travel. Other systems have offered greater sensitivity by utilizing sensors to detect displacement of a light beam reflected by a reflective panel on the inside of the central bumper panel to detect displacement of the panel, however, these systems may be excessively sensitive to movement of the bumper panel caused by irregularities in the surface over which the automatic guided vehicle is traveling causing unnecessary shutdown of the automatic guided vehicle material handling system.

Many safety bumpers of the prior art are difficult to adjust during manufacture and require expensive sensing components.

DISCLOSURE OF THE INVENTION

It is an object of the present invention to provide a safety bumper for an automatic guided vehicle which is very sensitive to displacement by encounter with an object in the vehicle path yet will not cause "nuisance trips" which cause the vehicle to stop when no object is in its path due to vibration caused by irregularities in the surface over which the vehicle is traveling.

It is a further object to provide a safety bumper for an automatic guided vehicle which has no dead spots in its sensing field.

It is yet another object to provide a safety bumper system whose fabrication does not require expensive components, or a large number of components, and is easily fabricated and assembled.

It is a further object to provide a safety bumper system which does not require lengthy sensitivity adjustment for effective operation.

It is a further object of the present invention to provide a safety bumper which can reset after an object which has been encountered has been moved from the vehicle path and which can undergo repetitive actuation without damage.

It is yet another object of the present invention to provide a bumper which can be fitted to vehicles of a diversity of plan form, width and length.

A safety bumper for an automatic guided vehicle comprising a preferred embodiment of the present invention includes a flexible, resilient, band-like displacement member including a central portion generally transverse to a direction of travel of the automatic guided vehicle and two end portions curving backward to ends of the sensing member which are attached to two front corners of the automatic guided vehicle. At each corner, the respective end of the band like detection member is fastened to the corner by a freely swinging hinge. Each hinge has a pin which is fixed to rotate with the bumper side of the hinge. A cam assembly, including a cantilevered arm, is attached to the bottom of the hinge pin to rotate with the pin and bumper end as a unit. A cylindrical proximity switch which can sense the presence of metal objects in a field of view directly in front of its face is attached to a corner panel at each corner. A set screw allows adjustment of the cam lever about the hinge pin axis to position the lever directly beneath the face of the proximity switch when the flexible detection member is in repose. Thus, when the flexible detection member is disturbed the hinge is caused to rotate moving the lever member from the field of view of the proximity switch and changing the state of the switch. The proximity switch is adjustable vertically relative to the lever to adjust the distance between the detection face of the proximity switch and the lever and, thus, the sensitivity of the proximity switch to lever movement.

To increase the stability and memory of the flexible detection member, an aluminum channel is fastened to the inside of its central portion. Cables are fixed to this channel at two positions to either side, and equidistant from, a longitudinal vehicle axis. The opposite end of each of these cables is then attached to a front panel of the vehicle at a point further removed from the longitudinal vehicle axis than the distance between the attachment point to the reinforcement member from the longitudinal axis toward the respective vehicle forward corner. Thus, the central forward portion of the flexible detection member, front panel of the vehicle and two stability cables define a symmetrical trapezuide. The curved portions of the resilient flexible detection member thus urge the central portion away from the vehicle to maintain tension in the stabilizing cables. Preferably, corner panels of the vehicle are designed with an angled corner such that the attachment point of the respective hinge may lie behind the forward panel of the automatic guided vehicle to allow complete collapse of the bumper without damage. The angled portion also facilitates allowing of the bumper to extend to the side of the vehicle to provide an extra measure of side protection.

In operation, when an object in the path of the automatic guided vehicle comes in contact with the flexible detection member, the portion of the member contacted by the object will be collapsed inward toward the vehicle causing rotation of one or both of the flexible detection member ends, together with the respective hinge pin and cam lever, moving the lever from the field of detection of the proximity switch and causing the switch to be change state and generate a signal indicative of encountering an object. A control unit is provided which receives the obstacle indicative signal of the proximity switch and causes motion of the vehicle to cease in response to that signal.

These and further objects and aspects of the present invention will become evident after perusal of the detailed description below and consideration of the drawings.

BRIEF DESCRIPTION OF THE DRAWINGS

FIG. 1 is a plan view of an automatic guided vehicle with safety bumpers in accordance with the present invention provided at opposite ends of the vehicle.

FIG. 2 is a more detailed plan view of a safety bumper for an automatic guided vehicle comprising a preferred embodiment of the present invention.

FIG. 3 is a detailed elevation of the hinge and motion sensing assembly of a safety bumper for an automatic guided vehicle comprising a preferred embodiment of the present invention.

DETAILED DESCRIPTION OF THE INVENTION

Automatic guided vehicle 10, shown in the plan view of FIG. 1, has a longitudinal axis 15 and may travel in either of directions A and B. Safety bumpers 20 comprising a preferred embodiment of the present invention are provided at each of ends 12 of automatic guided vehicle 10. Bumpers 20 are shown in greater detail in the plan view of FIG. 2, and comprise a flexible, resilient, band-like detection member 30 with central portion 32 and end portions 34 which are bowed and curve backward to displacement member ends 36. Ends 36 are attached to bumper sides 42 of bumper hinges 40 by rivets 48 as may be seen in the cutaway sectional view of FIG. 3, taken at line III—III in FIG. 2. Displacement member 30 may be fabricated of any sufficiently flexible and resilient material, for example, Lexan ® material as manufactured by General Electric Company. Hinge pin 46 is fixed to rotate with bumper side 42 of hinge 40. Vehicle side 44 of hinge 40 is fixed to corner panel wall 14, and rotatably embraces hinge pin 46.

Cam assembly 50 is fixed to the base of hinge pin 46 and comprises lever 52, sleeve 54 and set screw 56. Sensor assembly 60 is fixed to the inside of corner panel 14 of automatic guided vehicle 10 and comprises proximity switch 62 secured to bracket 64 by retention nut 66, 67.

To enhance stability and resilient memory to bumper 20, reinforcement member 80, fabricated from a lightweight rigid material, for example, aluminum or nonmetallic extruded channel, is fastened to the inside of central portion 32 of displacement member 30. Flexible positioning cables 82, for example, stainless steel cables, are attached to reinforcement member 80 at two locations on opposite sides of vehicle axis 15 and attached to respective corner panels 14 of automatic guided vehicle 10 at locations more distant from axis 15 than the attachment points to displacement member 30 such that central portion 32, front panel 16, and positioning cables 82 outline a trapezoidal shape in plan. In this configuration, bowed portions 34 of flexible resilient displacement member 30 urge central portion 32 outward, away from front panel 16 against the restraining tension in positioning cables 82. This configuration of the exemplary preferred embodiment of the automatic guided vehicle safety bumper 20 of FIGS. 1 and 2 maintains a stable configuration of flexible, resilient displacement member 30 during vehicle operations while allowing displacement member 30 to partially or totally collapse upon impacting an object in the path of motion of automatic guided vehicle 10.

In the preferred exemplary embodiment of FIGS. 1 and 2, corner panels 14 are angled backward at 45 degrees to allow complete collapse of displacement member 30 without damage and to allow bumper 20 to provide extra side protection by allowing bowed portions 34 of displacement member 30 to extend to the side of automatic guided vehicle 10.

During normal operation of automatic guided vehicle 10, bumper 20 of the exemplary preferred embodiment remains fully extended and in the configuration shown in the plan views of FIGS. 1 and 2. Upon coming into contact with an object in the path of automatic guided vehicle 10, displacement member 30 of bumper 20 will begin to collapse. As it collapses, flexible member 30 will change shape causing one or both of ends 36 to rotate, together with hinge pin 46, to accommodate a new bumper plan form shape. This results in rotation of lever 52 about the axis of hinge pin 46 partially or completely removing lever 52 from the field of view of proximity switch 62 and causing switch 62 to change state and generate a signal indicative of encountering an object. This signal is transmitted to a conventional control device (99) by means of signal cable 68. Upon receipt of such a signal, the control device causes automatic guided vehicle 10 to stop moving. Proximity switches 62 are wired in an "OR" configuration so that a change of state signal by either or both of switches 62 will cause automatic guided vehicle 10 to come to a stop. In the exemplary preferred embodiment, the lengths of cables 82 are selected such that the distance between central portion 32 and front panel 16 is about 16 inches, which is sufficient to bring automatic guided vehicle 10 to a halt from a speed of about 250 feet per minute before front panel 16 collides with an object detected by displacement member 30.

Set screw 56 in collar 54 allows rotational adjustment of cam assembly 50 about the axis of hinge pin 46 such that lever 52 may be positioned directly in front of proximity switch face 63 when safety bumper 20 is in repose. Sensitivity of safety bumper 20 to contact with objects may be adjusted by a moving proximity switch 62 vertically upward or downward to increase or decrease the distance between face 63 of proximity switch 62 and lever 52 by turning retention nuts 66, 67.

While a safety bumper for an automatic guided vehicle comprising a preferred embodiment of the present invention has been described herein it will be understood, of course, that the invention is not limited to that embodiment. Modification may be made by those skilled in the art, particularly in view of the foregoing teachings. It is, therefore, contemplated by the appended claims to cover any such modification which incorporates the essential features of the invention or which encompasses the spirit and scope of the invention.

We claim:

1. A safety bumper for detecting objects lying in the path of a moving automatic guided vehicle, the automatic guided vehicle having a front end including a forward most surface in a direction of travel of the vehicle and a first and second front corner on a first and second side of the vehicle, respectively, the bumper comprising:
   a flexible detection member including a central portion lying generally transverse to the direction of travel and first and second end portions curving backward toward the vehicle front end to a first and second detection member end, respectively;
   a first and second hinge pin rigidly attached to said first and second end, respectively;
   a first and second vehicle hinge portion attached to said first and second vehicle front corner, respectively, and sized to receive said first and second hinge pin, respectively, such that said first and second end may rotate about a first and second vertical axis;
   first and second cams attached to said first and second hinge pin, respectively, and including a first lever and a second lever extending from said first and second hinge pin respectively in a generally horizontal plane in a characteristic position about said vertical axis when said flexible detection member is in repose;
   first and second sensing means for sensing a position of said first and second lever, respectively, and generating a clear signal when said lever is in said characteristic position and generating an obstacle signal when said lever is displaced from said characteristic position by a predetermined amount; and,
   control means for receiving said obstacle signal and stopping any motion of the automatic guided vehicle in the direction of travel whenever an obstacle signal is received.

2. A safety bumper for an automatic guided vehicle as in claim 1, in which said first and second sensing means are proximity switches and said first and second levers are metallic.

3. A safety bumper for an automatic guided vehicle as in claim 1 in which said first and second levers each include a generally horizontal surface.

4. A safety bumper for an automatic guided vehicle as in claim 1 further comprising:
   first and second stabilizing members, each of said members having a detection member end and a vehicle end, each of said detection member ends attached to said detection member and each of said vehicle ends attached to the vehicle.

5. A safety bumper for an automatic guided vehicle as in claim 4, in which said vehicle ends are separated by a distance greater than a distance separating said detection member ends.

6. A safety bumper for an automatic guided vehicle as in claim 5, further comprising a rigid reinforcement bar attached to a central portion of said detection member.

7. A safety bumper for an automatic guided vehicle, the vehicle having a longitudinal axis parallel to a direction of travel of the vehicle and an end portion including first and second corners on opposite sides of said axis and a forward-most surface in the direction of travel generally perpendicular to the longitudinal axis, the bumper comprising:
   a flexible band-like displacement member including a central portion generally perpendicular to the axis and first and second end portions;
   first and second attachment means, including first and second hinge means, respectively, for attaching said first and second end portions to the automatic guided vehicle at the first and second corners, respectively, such that said first and second end portions may be displaced rotationally about a vertical axis;
   first and second cam means, including first and second levers, respectively, said first and second cam means connected to said first and second end portions such that said first and second levers are displaced when said first and second end portions are displaced, respectively;
   sensing means for sensing displacement of said first and second lever means;
   said first and second end portions curve toward said first and second attachment means, respectively, such that, when the bumper is in repose, said central portion is in fixed, set-apart relation to the most forward surface;
   said first and second hinge means include a first and second hinge pin rigidly attached to said first and second end portion, respectively, and said first and second levers are rigidly attached to a base of said first and second pin, respectively.

8. A safety bumper for an automatic guided vehicle as in claim 7, in which said sensing means includes first and second proximity switches rigidly attached to the automatic guided vehicle at the first and second corner above said first and second lever, respectively, for detecting the presence of said first and second lever beneath said first and second proximity switches, respectively.

9. A safety bumper for an automatic guided vehicle as in claim 8 in which the first and second corner each include a backward angled portion such that said first and second attachment means are recessed behind the forward-most surface.

10. A safety bumper for an automatic vehicle as in claim 8 further comprising:
    first and second flexible tension members, each tension member including a bumper end attached to said displacement member and a vehicle end attached to the automatic guided vehicle end portion, said first and second flexible tension members lying on opposite sides of the longitudinal axis.

11. A safety bumper for an automatic vehicle as in claim 10 in which said first and second bumper ends are separated by a distance less than a distance by which said first and second vehicle ends are separated.

12. A safety bumper for an automatic guided vehicle as in claim 10 further comprising a reinforcement member extending from said first tension member bumper end to said second tension member bumper end.

* * * * *